United States Patent Office 3,677,877

Patented July 18, 1972

3,677,877

ARTICLE OF SILICONE RUBBER HAVING SURFACES RESISTANT TO DIRT PICK-UP

Virgil L. Metevia and Raymond M. Narlock, Bay City, and Milfred E. Mast, Williams Township, Bay County, Mich., assignors to Dow Corning Corporation, Midland, Mich.

No Drawing. Filed Oct. 30, 1970, Ser. No. 85,703

Int. Cl. B32b *25/20;* D06n *7/04*

U.S. Cl. 161—164 2 Claims

ABSTRACT OF THE DISCLOSURE

Articles of optically clear filled silicone rubber and filled silicone rubber articles having aesthetic value have surfaces resistant to dirt pick-up when treated with cold plasma.

The invention herein described was made in the course of or under a contract or subcontact thereunder with the Department of Army.

This invention relates to filled silicone rubber articles having surfaces resistant to dirt pick-up.

Optically clear articles, as well as, articles of aesthetic value lose their usefulness if they become dirty and their usefulness is even more reduced if these articles become permanently dirty. When synthetic polymeric materials are used, the ease of dirt pick-up and amount of dirt pick-up will obviously determine their usefulness in the areas where optical clarity and aesthetic value are principal functions of the article. Silicone rubber has many uses and because of its desirable physical and chemical properties, it would be useful in many areas where optical clarity and aesthetic value are required. However, silicone rubbers have found only token utility in these areas because they are exceptionally susceptible to dirt pick-up. For this reason, the need exists for optically clear silicone rubber articles and silicone rubber articles with aesthetic value which are not susceptible to dirt pick-up.

It is, therefore, an object of the present invention to provide filled silicone rubber articles which have surfaces resistant to dirt pick-up.

This invention relates to an article comprising a filled silicone rubber selected from the group consisting of optically clear silicone rubber articles and silicone rubber articles of aesthetic value having a surface resistant to dirt pick-up wherein said surface has been treated for at least one minute with cold plasma from an inert gas and thereafter exposed to ambient atmospheric conditions for at least four hours.

The filled silicone rubber articles can be prepared from any of the well known filled silicon rubber stocks which are available commercially. These filled silicone rubber stocks are shaped and cured into articles by any desirable means. The filled silicone rubbers include both those that are heat cured and those that are cured at room temperature. The filled silicone rubber articles can be either optically clear or of an aesthetic value. The following patents are cited to illustrate the filled silicone rubbers described in the prior art. These patents are hereby incorporated by reference to describe filled silicone rubber.

U.S. Pat. No. 2,572,227 (Warrick) describes silicone rubbers comprising a readily deformable polymeric siloxane having a viscosity of at least 5000 cs. at 25° C. and a degree of substitution of 1.95 to 2.05 organic groups per silicon atom where the organic groups are methyl or monocyclic-aryl radicals with at least 50 mol percent being dimethylsiloxane units, a filler and from 1 to 10 weight percent tertiary butyl peracetate based on the weight of the siloxane.

U.S. Pat. No. 2,568,672 (Warrick) described a silicone rubber comprising a liquid methylpolysiloxane having a viscosity above 1,000 cs. at 25° C., an average of 1.75 and 2.25 methyl radicals per silicon atom and at least 40 mol percent of the polysiloxane being dimethylsiloxane units, a filler in an amount sufficient to form a pasty mass and from 2 to 6 percent benzoyl peroxide based on the weight of methylpolysiloxane.

U.S. Pat. No. 2,560,498 (Warrick) describes a heat curable silicone rubber comprising a copolymeric siloxane having principally dimethylsiloxane units and the remainder being siloxane units having one alkyl radical of less than three carbon atoms attached to each silicon atom and one monocyclic aryl hydrocarbon radical attached to each silicon atom, a filler and from 2 to 10 percent based on the weight of the siloxane of an acyl peroxide having at least one aromatic acyl group.

U.S. Pat. No. 2,658,882 (Maneri) describes a heat curable silicone rubber comprising 100 parts of an organopolysiloxane having an average of 1.95 to 2.05 methyl and phenyl radicals per silicon atom and at least 50 percent of the radicals are methyl, a silica filler, a vulcanizing agent and at least 0.5 part by weight of metallic zirconate salts, zirconium silicates or metal fluorozirconates.

U.S. Pat. No. 2,684,957 (Konkle) describes a heat curable low compression set silicone rubber comprising a polymeric organosiloxane having a viscosity of at least 10,000 cs. at 25° C. and from 1.9 to 2 phenyl and methyl radicals per silicon atom, a filler, a vulcanizing agent and from ¾ to 8 parts by weight based on 100 parts by weight of the siloxane of cadmium oxide, cadmium peroxide or cadmium carbonate. Also described is a mixture of the cadmium oxide, cadmium peroxide or cadmium carbonate with zinc oxide, zinc peroxide or zinc carbonate.

U.S. Pat. No. 2,718,512 (Warrick) describes a low compression set heat curable silicone rubber comprising 100 parts by weight of a diorganopolysiloxane having from 1.9 to 2 organic radicals per silicon atom where the organic radicals are alkyl, phenyl or siliconeopentyl radicals wherein at least 50 percent of the total number of radicals are alkyl and having a viscosity of at least 5000 cs. at 25° C., a filler, an organic peroxide vulcanizing agent and from 1/16 to 10 parts by weight of zinc oxide or zinc peroxide based on 100 parts by weight of the siloxane.

U.S. Pat. No. 2,721,857 (Dickmann) describes a silicone rubber comprising 100 parts of an organopolysiloxane having 1.99 to 2.0 organic groups per silicon atom where the organic groups are lower aliphatic hydrocarbon radicals, monocyclic aryl hydrocarbon radicals, halogenated monocylic aryl hydrocarbon radicals and halogenated lower aliphatic hydrocarbon radicals, a filler and from 0.005 to 0.090 part by weight of boric acid, boric acid anhydride or alkyl borates.

U.S. Pat. No. 2,723,964 (Warrick) describes a heat curable silicone rubber comprising 100 parts by weight of a polymeric benzene soluble diorganopolysiloxane having monovalent hydrocarbon radicals or halogenated monovalent hydrocarbon radicals and a viscosity of at least 20,000 cs. at 25° C. and from 30 to 100 parts of a water insoluble, polynuclear benzenoid organic compound as a filler and a peroxide vulcanizing agent.

U.S. Pat. No. 2,803,619 (Dickmann) describes a heat curable low compression set silicone rubber comprising a diorganopolysiloxane gum, a vinyl containing organosiloxane, an organic peroxide vulcanizing agent and a filler.

U.S. Pat. No. 2,819,236 (Dickmann) describes a heat curable low durometer silicone rubber comprising 100 parts by weight of a diorganopolysiloxane gum in which the organic radicals are monovalent hydrocarbon radicals and/or hologenated monovalent hydrocarbon radicals, 10 to 35 parts by weight of a copolymeric fluid having a viscosity of less than 1,000,000 cs. at 25° C. and composed of 20 to 60 mol percent dimethylsiloxane, 30 to 60 mol percent phenylmethylsiloxane, 5 to 15 mol percent alkylvinylsiloxane, phenylvinylsiloxane or vinylsiloxane and 0.0003 to 35 mol percent alkyldimethylsiloxane or phenyldimethylsiloxane, a peroxide vulcanization agent and a filler.

U.S. Pat. No. 2,842,516 (Nitzche and Wick) describes a heat curable silicone rubber comprising a non-resinous organopolysiloxane having 1.75 to 2.25 organic groups per silicon atom, a filler, a vulcanizing agent and an organic tin compound.

U.S. Pat. No. 2,863,846 (Tyler) describes a heat curable silicone rubber comprising 100 parts by weight of a benzene soluble organopolysiloxane having a viscosity of at least 10,000 cs. at 25° C., having from 1.98 to 2 organic radicals per silicon atom where the organic radicals are methyl, ethyl, phenyl, trifluoromethylphenyl or siliconeopentyl and at least 50 percent of the organic radicals are alkyl, 10 to 100 parts by weight of a silica filler which is treated with organosilyl groups, and an organic peroxide.

U.S. Pat. No. 2,927,908 (Konkle and Talcott) describes a heat curable silicone rubber comprising 100 parts by weight of an organopolysiloxane gum having methyl radicals and beta-(perfluoroalkyl)ethyl radicals on at least 90 mol percent of the siloxane units and the remaining siloxane units having organic radicals of methyl, phenyl or vinyl radicals, 35 to 125 parts by weight polytetrafluoroethylene, at least 5 parts by weight of an inorganic filler and 0.1 to 10 parts by weight of an organic peroxide.

U.S. Pat. No. 2,983,697 (Brown and Hunter) describes a silicone rubber comprising 100 parts by weight of a diorganopolysiloxane having a viscosity of at least 10,000 cs. at 25° C., from 0.01 to 0.16 part by weight of boron added as a tris-triorganosilyl-borate, a reinforcing silica filler and a vulcanizing agent.

U.S. Pat. No. 2,999,076 (Talcott) describes a heat curable, heat stable translucent silicone rubber stock comprising 100 parts by weight of an organosiloxane having 1.9 to 2.1 organic radicals per silicon atom where the organic radicals are monovalent hydrocarbon radicals and halogenated monovalent hydrocarbon radicals, a silica filler, 0.001 to 0.40 part by weight of cobalt, cerium or copper added as the metal salt of a carboxylic acid, and an organoperoxide vulcanizing agent.

U.S. Pat. No. 3,006,878 (Talcott) describes a solvent resistant silicone rubber stock comprising 100 parts by weight of a polysiloxane having a viscosity of at least 100,000 cs. at 25° C. and consisting of at least 90 mol percent beta-perfluoroalkylethylmethylsiloxane units, 1 to 30 parts by weight of a hydroxylated organosilicon compound of not more than 110 silicon atoms having attached to at least 50 percent of the silicon atom a beta-perfluoroalkylethyl radical and at least 0.25 weight percent silicon-bonded hydroxyl radicals, 0.25 to 10 parts by weight of a benzene-soluble organosilicon compound, a vulcanizing agent and from 15 to 100 parts by weight of a reinforcing silica filler.

U.S. Pat. No. 3,024,214 (Fenner) describes a silicone rubber comprising 100 parts by weight of an organopolysiloxane gum, 10 to 100 parts by weight of a reinforcing silica filler, 0.1 to 10 parts by weight of an organic peroxide vulcanizing agent, and from 0.1 to 30 parts by weight of a fluid orthosilicate or polysilicate where the sured silicone rubber is treated with an amino compound.

U.S. Pat. No. 3,065,201 (Talcott) describes a silicone rubber comprising 100 parts by weight of 3,3,3-trifluoropropylmethylpolysiloxane, 2 to 20 parts by weight of a high molecular weight benzene soluble organosiloxane, an inorganic filler and a vulcanizing agent.

U.S. Pat. No. 3,086,954 (Polmanteer and Metevia) describes a heat curable silicone rubber stock comprising a hydroxylated organosilicon polymer, a modified silica filler and cyanoguanidine.

U.S. Pat. No. 3,122,516 (Polmanteer) describes heat curable silicone rubbber stock comprising an organopolysiloxane having at least 800 silicon atoms per molecule, a modified silica filler and an organic peroxide catalyst.

U.S. Pat. No. 2,759,904 (Talcott) describes a heat stable and translucent silicone rubber stock comprising an organopolysiloxane, a silica filler, 0.001 to 0.400 part by weight per 100 parts by weight of the organopolysiloxane of iron added as an iron salt of a carboxylic acid and an organoperoxide vulcanizing agent.

U.S. Pat. No. 3,036,985 (Daudt) describes a heat curable, transparent silicone rubber comprising an organopolysiloxane which is at least 50 mol percent dimethylsiloxane units, a filler having a pore volume of at least 3 cc. per g. and 1 to 50 mol percent of monoorganosiloxane units where the organic group is an aliphatic hydrocarbon radical of less than 5 carbon atoms, 4 to 30 mol percent dimethylsiloxane units and trimethylsiloxane units and 46 to 95 mol percent $SiO_2$ units, and a vulcanizing agent.

U.S. Pat. No. 3,094,446 (Burdick and Polmanteer) describes a transparent silicone rubber comprising a diorganopolysiloxane where the organic groups are methyl, phenyl, vinyl and 3,3,3-trifluoropropyl and at least 50 percent are methyl radicals, 5 to 15 parts by weight per 100 parts by weight of the diorganopolysiloxane of dicyclopentadienedioxide, a vulcanizing agent and a filler.

U.S. Pat. No. 3,341,490 (Burdick, Mishler and Polmanteer) describes optically clear silicone rubber comprising 60 to 70 parts by weight of a dimethylvinylsilyl endblocked copolymer of 6 to 9 mol percent phenylmethylsiloxane units, 0.1 to 2 mol percent of vinylmethylsiloxane units and the remainder dimethylsiloxane units, 30 to 40 parts by weight of a dimethylvinylsilyl endblocked copolymer of 15 to 25 mol percent methylvinylsiloxane units, 4 to 6 mol percent phenylmethylsiloxane units and the remainder dimethylsiloxane units, a reinforcing silica filler and an organic peroxide vulcanizing agent.

U.S. Pat. No. 3,518,324 (Polmanteer) describes an optically clear silicone rubber comprising 100 parts by weight of the diorganolysiloxane combination described in U.S. Pat. No. 3,341,490, to 10 parts by weight of a resin trimethoxylsiloxane unit, dimethylvinylsiloxane units and $SiO_2$ units were the ratio of the sum trimethylsiloxane units and dimethylvinylsiloxane units to $SiO_2$ units is from 0.6–1.2 to the diorganopolysiloxane being free of materials having molecular weights of less than 5000, an organic peroxide vulcanizing agent.

Other patents describing filled silicone rubber stops are U.S. Pat. No. 2,541,137 (Warrick), U.S. Pat. No. 2,890,-188 (Konkle, McHard and Polmanteer), U.S. Pat. No. 3,-050,492 (Polmanteer and Brown), U.S. Pat. No. 3,061,-565 (Collings), U.S. Pat. No. 3,192,181 (Moore), U.S. Pat. No. 3,308,203 (Metevia and Polmanteer), U.S. Pat. No. 3,350,351 (Hansen and Talcott), U.S. Pat. No. 2,-823,218 (Speier and Hook), U.S. Pat. No. 3,061,575 (Russell), U.S. Pat. No. 3,070,559 (Nitzsche and Wick), U.S. Pat. No. 3,070,560 (Metevia), U.S. Pat. No. 3,179,-619 (Brown), U.S. Pat. No. 3,243,404 (Martellock), U.S. Pat. No. 3,268,473 (Brown), U.S. Pat. No. 3,294,-739 (Weyenberg), U.S. Pat. No. 3,313,762 (Pfeifer), U.S. Pat. No. 3,334,067 (Weyenberg), U.S. Pat. No. 3,445,420 (Kookootsedes and Plueddemann), U.S. Pat. No. 3,453,-234 (Kookootsedes), U.S. Pat. No. 3,453,233 (Flatt), and U.S. Pat No. 3,461,185 (Brown).

After the silicone rubber article has been cured, the surface of the silicone rubber is exposed to a cold plasma from an inert gas for at least one minute. Preferably, the plasma generators are available commercially. The cold plasma exposed silicone rubber surface is then exposed to ambient atmospheric conditions. Silicone rubber articles only exposed to the cold plasma treatment and then not allowed to come into contact with atmospheric conditions for at least four hours will not be resistant to dirt pick-up.

For the purpose of the present invention cold plasma is derived from an inert gas, such as air, nitrogen, helium, argon, neon, krypton, xenon and hydrogen. The inert gas produces a glow of excited molecular pieces which forms a cold plasma of the particular gas used. The particular energy level to produce the glow is not critical since the purpose is to product the inert gas cold plasma. The silicone rubber article is situated so that the cold plasma strikes the surface to be treated. The glow can take place either at atmospheric pressure or at reduced pressure, reduced pressures are preferably used, since a greater distance between the electrodes can be used. The cold plasma can be generated by means of electromagnetic energy applied across external capacitor elements, such plasma generators are available commercially. The cold plasma is prepared by methods known in the art. The procedures can be generally summarized by the more detailed description as follows.

The cold plasma can be prepared by using an electrical power source to excite the gases. The output of the electrical power sources can be a three kilohertz, 0 to 12 kilovolt source or a 60 hertz, 0 to 15 kilovolt source, for example. The cold plasma can readily be generated by fixing the frequency at three kilohertz and the voltage at 3 to 10 kilovolts. The higher frequency source is preferred inasmuch as the treatment times are usually less to provide an equivalent effect. Cold plasma can also be produced by radio frequency or microwave power sources, wherein the results are equivalent for the treatment of silicone rubber.

The silicone rubber articles to be treated are preferably placed under subatmospheric conditions ranging from $10^{-6}$ to $20^2$ torr, however, pressures of 10 to 20 p.s.i.a. are also suitable to provide cold plasma. The particular type of treating chamber and apparatus used will be determined by the shape and size of the silicone rubber article to be treated. When the higher pressures are used, the electrodes are placed on each side of the silicone rubber article to be treated, the electrodes conforming to the geometry of the silicone rubber article. The assembly is so arranged to allow the cold plasma to pass over all the surfaces to be treated. The electrodes can be of varying materials such as conductive glass or metal. The necessary precautions should be used to prevent arcing. Means for containing the inert gas are used, so that the pressure can be controlled and outside interferences are avoided. The silicone rubber article and electrodes are placed in the container and purged with an inert gas at a desired pressure, such as 1 to 10 p.s.i.g. The electrical energy is then applied and adjusted to provide a highly visible glow which is then maintained for the treatment period. After the treatment period the power source is disconnected, the gas flow stopped, the silicone rubber article is removed and thereafter exposed to ambient atmospheric conditions for at least four hours.

For the treatment of silicone rubber articles at subatmospheric pressures, a chamber having a gas inlet tube and outlet tube can be used. The electrodes are preferably placed on the outside of the chamber or tube and do not come into contact with the inert gas. The electrodes can be wire or silver paint, for example. One electrode is placed either around the outside of the tube or around one end of the chamber near the inlet tube. The other electrode is placed on the outside of the chamber away from the inlet tube. The inert gas can be passed through the inlet tube where it begins to glow and the cold plasma then impinges on the silicone rubber article in the chamber. The silicone rubber article to be treated is placed in the chamber, the pressure is reduced to the desired level and the inert gas is permitted to enter and purge the system. After the chamber has been properly purged, the electrical energy is applied and the voltage adjusted to provide a good glow. After the cold plasma has treated the silicone rubber article for a sufficient length of time, the power source is disconnected and the chamber is brought back to atmospheric pressure. The silicone rubber article is then removed and exposed to ambient atmospheric conditions for at least four hours.

Where radio frequency or microwave sources are used to form the cold plasma, the geometry and apparatus can be changed to provide the most convenient operation.

When the silicone rubber articles are exposed to the ambient atmospheric conditions after the cold plasma treatment, the atmosphere should be reasonably clean so that the silicone rubber article will not pick up unwanted dust or dirt from the atmosphere. The silicone rubber articles treated with the cold plasma are not sufficiently resistant to dirt pick-up until they have been exposed to ambient atmospheric conditions for at least four hours.

The cold plasma treated surfaces of the silicone rubber articles are resistant to dirt pick-up. This is completely unexpected, since the prior art uses cold plasma to increase the adhesion of surfaces of polymeric materials to other materials. The cold plasma treatment does not affect the optical quality of the silicone rubber articles or their aesthetic value. Also there is no harmful effects to the physical properties of the silicone rubber articles.

The silicone rubber articles can be of varied shapes and sizes. For example, they can be lenses for protective eye cover, gas mask facial coverings, silicone rubber articles which encapsulate electrical equipment, art objects, decorative strippings or moldings, medical devices, tubing, catheters and the like.

The following examples are illustrative only and should not be construed as limiting the present invention which is properly delineated in the claims.

EXAMPLE 1

A silicone rubber stock was prepared from a mixture of 100 parts by weight of a dimethylvinylsiloxy endblocked polydiorganosiloxane gum having 94 mol percent dimethylsiloxane units, 5.5 mol percent diphenylsiloxane units and 0.5 mol percent methylvinylsiloxane units, 70 parts by weight of a trimethylsiloxy treated fumed silica filler, 1.7 parts by weight of a trimethylsiloxy endblocked polydiorganosiloxane fluid having dimethylsiloxane units and methyl hydrogen siloxane units and having about 0.8 weight percent silicon-bonded hydrogen atoms, 0.595 part by weight of a platinum catalyst and 0.272 part by weight of methylbutynol. The silicone rubber stock was molded into lens-shaped articles. The silicone rubber stock was molded for 10 minutes at 177° C. and then cured for one hour at 200° C. The cured silicone rubber article was optically clear and had a durometer of 69 on the Shore A scale, a tensile strength at break of 1410 p.s.i., an elongation at break of 260 percent, a Die B tear strength of 108 p.p.i. and a Bashore resilience of 41. The silicone rubber lenses were treated with cold plasma under the conditions specified and the results were as shown. The treated lenses were exposed to ambient atmospheric conditions for 16 hours prior to determining the resistances of the surface to dirt pick-up. The resistance to dirt pick-up was determined by immersing the lens in a standard dirt formulation and after removal the lens was tapped against a solid surface to remove any excess dirt. The standard dirt formulation was 748 parts by weight of screened peat moss, 109 parts by weight of calcium carbonate, 21 parts by weight of five micron silica, 21 parts by weight of cement, 21 parts by weight of calcined clay, 5 parts by weight of furnace black, 1 part by weight of red iron oxide and 11 parts by weight of mineral oil.

| Lens No. | Frequency of power source | Voltage during treatment | Pressure | Inert gas | Length of treatment | Result of dirt pick-up test |
|---|---|---|---|---|---|---|
| 1 | Control |  | Atmospheric |  | None | Opaque. |
| 2 | 3 kHz. | 10 kilovolts | do | Air | 40 seconds | Do. |
| 3 | 3 kHz. | do | do | Air | 1 minute | Clear. |
| 4 | 3 kHz. | do | do | Air | 2 minutes | Do. |
| 5 | 3 kHz. | 8 kilovolts | do | Air | 5 minutes | Do. |
| 6 | 3 kHz. | 10 kilovolts | do | Air | 10 minutes | Do. |
| 7 | 60 Hz. | 15 kilovolts | do | Air | 2 minutes | Do. |
| 8 | 60 Hz. | do | do | Air | 10 minutes | Do. |
| 9 | 60 Hz. | 12 kilovolts | do | Air | 30 minutes | Do. |
| 10 | 60 Hz. | 15 kilovolts | do | Air | 60 minutes | Do. |
| 11 | 3 kHz. | 2 kilovolts | do | Argon | 40 seconds | Opaque. |
| 12 | 3 kHz. | do | do | do | 1 minute | Clear. |
| 13 | 3 kHz. | do | do | do | 5 minutes | Do. |
| 14 | 3 kHz. | 5 kilovolts | 5 torr | do | do | Eo. |
| 15 | 3 kHz. | 2–5 kilovolts | Atmospheric | do | 10 minutes | Do. |
| 16 | 3 kHz. | 8 kilovolts | 5 torr | do | do | Do. |
| 17 | 3 kHz. | 2–5 kilovolts | Atmospheric | do | 20 minutes | Do. |
| 18 | 3 kHz. | do | do | do | 40 minutes | Do. |

EXAMPLE 2

Silicone rubber slabs were molded as described in Example 1 from a silicone rubber stock as described in Example 1 except the polydiorganosiloxane gum had 0.142 mol percent methylvinylsiloxane units instead of 0.5 mol percent, 56 parts by weight of the silica filler, 1.56 parts by weight of the polydiorganosiloxane fluid, 0.546 part by weight of the platinum catalyst and 0.25 part by weight of the methylbutynol were used. The optically clear silicone rubber slab had a durometer of 45 on the Shore A scale, a tensile strength at break of 1660 p.s.i., an elongation at break of 650 percent, a Die B tear strength of 262 p.p.i. and a Bashore resilience of 34. The silicone rubber slab was treated for 40 minutes per side with an argon plasma at atmospheric pressure, at 5–6 kv. from a 3 kHz. source. The silicone rubber slab remained clear after immersion in the standard dirt formulation.

EXAMPLE 3

Optically clear silicone rubber test pieces prepared from a silicone rubber stock as described in Example 1 were treated with a commercial 150 watt, electrodeless cold plasma unit at a pressure of 0.9 mm. Hg with the gas and for the length of time specified below. The test pieces were rated after the immersion in the standard dirt formulation for their optical clarity where a rating of 1 was excellent clarity and 5 was opaque.

|  | Gas | Treatment time | Clarity rating |
|---|---|---|---|
| Test piece No.: |  |  |  |
| 1 | Nitrogen | 30 seconds | 4 |
| 2 | do | 5 minutes | 2 |
| 3 | Argon | 10 minutes | 1 |
| 4 | Helium | 1.5 minutes | 1.5 |

EXAMPLE 4

Gas mask facial coverings prepared from silicone rubber stock similar to the silicone rubber stock described in Example 1 were treated with cold plasma at reduced pressure using air, argon and helium. Treatments equivalent to those of Example 1 resulted in surfaces of the gas mask facial coverings which were resistant to dirt pick-up and retained their original appearance.

That which is claimed is:

1. An article comprising a filled silicone rubber selected from the group consisting of optically clear silicone rubber articles and silicone rubber articles of aesthetic value having a surface resistant to dirt pick-up wherein said surface has been treated for at least one minute with cold plasma from an inert gas and thereafter exposed to ambient atmospheric conditions for at least four hours.

2. The article according to claim 1 in which the silicone rubber is an optically clear silicone rubber article.

References Cited

UNITED STATES PATENTS

| | | | |
|---|---|---|---|
| 2,997,418 | 8/1961 | Lawton | 204—159.13 X |
| 3,350,216 | 10/1967 | McVannel | 117—47 A |
| 3,510,387 | 5/1970 | Robb | 161—164 X |
| 3,518,108 | 6/1970 | Heiss, Jr. et al. | 117—93.1 GD |
| 3,057,792 | 10/1962 | Frohlich | 204—165 |

PHILIP DIER, Primary Examiner

U.S. Cl. X.R.

117—47, 93.1; 161—206, 411; 204—159.13, 165